H. BAULIG.
PROCESS OF TREATING FRUIT JUICE.
APPLICATION FILED AUG. 11, 1919.

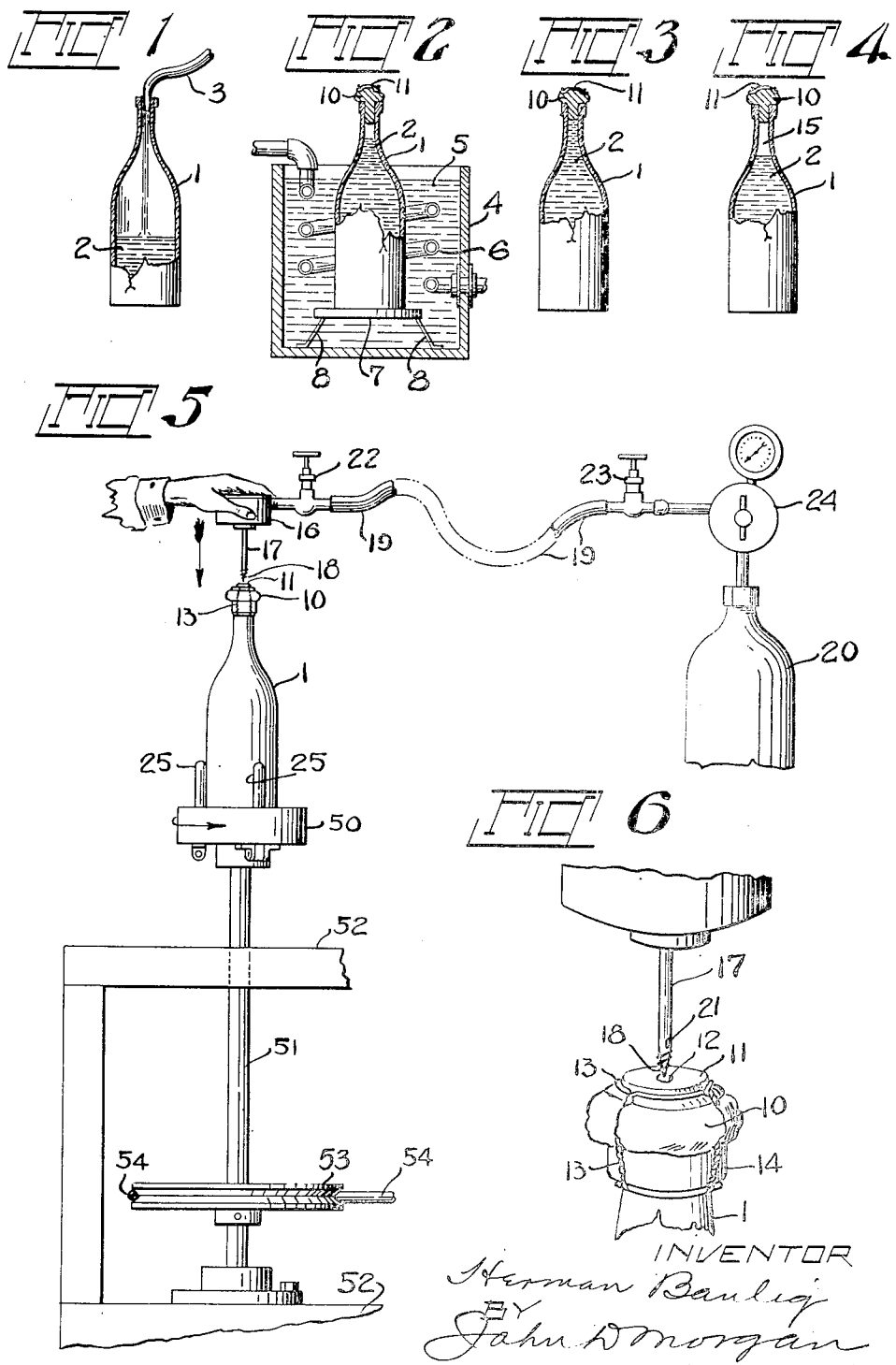

1,336,720.

Patented Apr. 13, 1920.
3 SHEETS—SHEET 2.

INVENTOR
Herman Baulig
BY
John D. Morgan
ATTORNEY

H. BAULIG.
PROCESS OF TREATING FRUIT JUICE.
APPLICATION FILED AUG. 11, 1919.
1,336,720.
Patented Apr. 13, 1920.
3 SHEETS—SHEET 3.
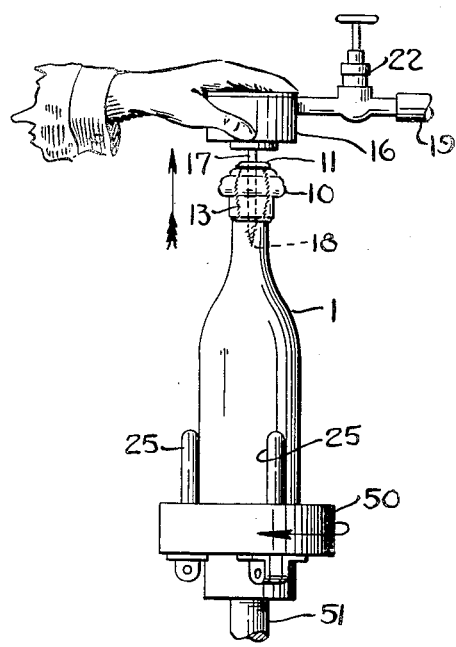
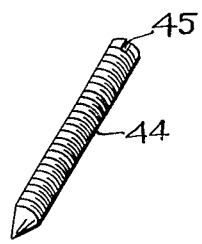
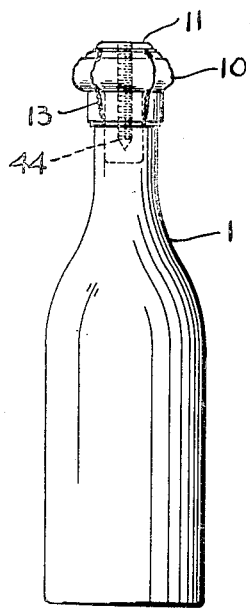
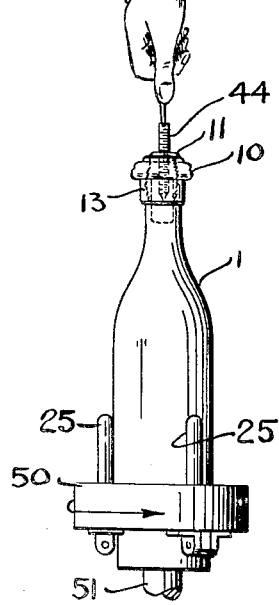
INVENTOR
Herman Baulig
BY
James Morgan
ATTORNEY

UNITED STATES PATENT OFFICE.

HERMAN BAULIG, OF EGG HARBOR, NEW JERSEY, ASSIGNOR TO H. T. DEWEY & SONS COMPANY, OF NEW YORK, N. Y., A CORPORATION OF NEW YORK.

PROCESS OF TREATING FRUIT-JUICE.

1,336,720. Specification of Letters Patent. Patented Apr. 13, 1920.

Application filed August 11, 1919. Serial No. 316,748.

*To all whom it may concern:*

Be it known that I, HERMAN BAULIG, a citizen of the United States, residing at Egg Harbor, in the State of New Jersey, have invented certain new and useful Improvements in Processes of Treating Fruit-Juice, of which the following is a specification.

The invention relates to a process for charging fruit juices or other liquids with gas, and relates more particularly to carbonating sterilized fruit juice while sealed from the atmosphere.

Objects and advantages of the invention will be set forth in part hereinafter and in part will be obvious herefrom, or may be learned by practice with the invention; the same being realized and attained through the steps and processes pointed out in the appended claims.

The invention relates to a process for treating fruit juices and more especially to a process for sterilizing the juice and charging the sterilized juice with gas without exposing it to fermentative contamination or infection.

The invention consists in novel steps, sequence of steps and processes herein shown and described.

The accompanying drawings, herein referred to and constituting a part hereof, illustrate by way of example one manner of practising certain steps of the process, and together with the description serve to explain the principles of the invention.

The drawings, or certain figures thereof, are somewhat diagrammatic in character, thereby more clearly showing certain features of the invention.

Of the drawings:

Figure 1 shows the filling of a bottle or container with fruit juice;

Fig. 2 shows the sterilizing of the juice in the sealed container;

Fig. 3 shows the sealed container while at sterilizing heat and while the juice is expanded from heat;

Fig. 4 shows the contraction of the cooled liquid within the sealed container;

Fig. 5 shows the insertion of the seal piercing and gas supplying conduit through the seal of the bottle while maintaining the sealed condition;

Fig. 6 shows the manner of inserting the gas conduit through the opening in the seal cap;

Fig. 11 shows the withdrawal of the gas conduit from the seal;

Fig. 12 shows the plug or resealing device;

Fig. 13 shows the inserting of the plug or resealing device;

Fig. 14 shows the resealing device completely inserted.

Figure 7:
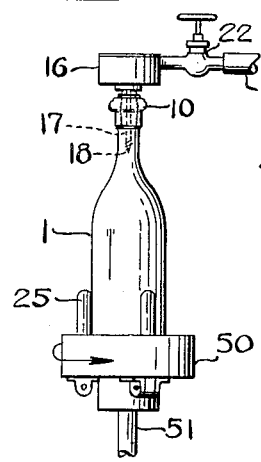
Fig. 7 shows the gas conduit in communication with the inside of the container while maintaining the sealed condition.

The invention relates to a process for sterilizing fruit juice from fermentative bacilli or germs and sealing the sterile juice away from the air, and carbonating the sterile juice while sealed away from the air. It is well known that the fermentative bacilli are carried generally in the air, and that fruit juices exposed to the air will be infected thereby, or reinfected thereby after being sterilized. It is also very desirable to carbonate the juice, and the present invention provides for carbonating the previously sterilized juice without exposing it again to air infection or contamination. In this way the carbonated juice may be kept indefinitely without mixing with it objectionable and frequently deleterious chemical preservatives. The process of carbonating or charging under seal also permits or makes possible a much heavier or more complete charging with the gas, and also keeps the juice from deterioration through cloudiness or turbidity.

Referring to the exemplary manner of carrying out the process, illustrated in a somewhat diagrammatic manner in the accompanying drawings, the invention may be regarded as applied to carbonating grape juice, that is, charging the grape juice with "carbonic acid gas", the juice being primarily sealed and sterilized, the gas being introduced into the sterilized juice while the seal against contaminating or infecting air is maintained intact.

In Fig. 1 of the drawings, the bottle or container 1, which has preferably itself been preliminarily sterilized, is filled with the grape juice 2 in any convenient or approved manner, and which is shown flowing from a conduit 3.

In Fig. 2 the bottle or container 1 is shown filled with the juice, sealed and being submitted to the sterilizing operation. The sterilization may be carried out in any known approved or suitable manner and as shown, the filled bottle 1 is standing on a seat 7, which is supported on legs 8 within a container 4. This container 4 contains the hot, sterilizing liquid 5, which circulates around and beneath the full bottle or container 1.

The sterilizing liquid 5 may be kept steadily at the required sterilizing temperature by any suitable means, such as a steam or electric heating coil 6, or other suitable means.

The seal for the bottle neck is also applied in any suitable manner by hand or by any suitable mechanism shown in Figs. 2 and 3 and more fully in detail in Fig. 6. The usual and preferred form of seal comprises a cork 10 driven tightly into the bottle neck and a tin or other metal cap 11 placed thereover. This cap 11 has a small orifice 12 therein, which will be later referred to. A wire 13 is tied about the cap 11, cork 10 and about the enlarged top 14 of the bottle neck, thereby sealing tightly against the air the hot sterile juice, and firmly tying the seal in place. The bottle or container 1 is thus full of hot juice sterilized from fermentative bacteria or bacilli.

So long as the seal against the atmosphere is maintained, the sterile juice is safe from any re-infection or contamination from fermentative bacteria.

It is very desirable while maintaining such absolute sterility of the juice to charge it with gas, the usual carbon di-oxid, which step is usually known as carbonating. This step is not satisfactorily effected, before the sterilization, and has heretofore been impossible thereafter. By the present invention, the sterile juice is thoroughly carbonated while the seal against the atmosphere is maintained.

In Fig. 4 the sealed container is shown after it has cooled subsequent to sterilization, and by reason of the contraction of the juice 2 through cooling, a relatively small space or vacuum 15 is left in the top part of the bottle or container 1.

The carbonating of the sealed and sterile juice is effected according to this invention by introducing a gas conducting device through the seal into the interior of the bottle or container 1 while maintaining the sealed condition, that is, while preventing access of the atmosphere to the bottle and its contained juice.

The device used for this purpose comprises preferably a hand piece 16 which incloses a hollow gas conduit, having a projecting pipe or hollow rod 17, which has a sharp point 18, which rod is preferably screw threaded, or of somewhat gimlet form. The rod 17 is longitudinally hollowed, and communicates at its near end by means of a flexible pipe 19 with a source 20 of gas under pressure. The rod 17 has in or near its point 18 orifices 21 which communicate with, or open out from, the interior longitudinally disposed conduit within the rod. Suitable valves 22 and 23 may be provided and also a pressure reducing, or otherwise regulating, device or mechanism 24.

The gas conducting device is made to pierce the seal of the bottle 1 and at the same time it maintains the sealed condition, that is, prevents the access of air to the interior of the bottle or container 1. In the preferred manner of carrying out the invention, the point 18 of the gas conveying device is pressed through the opening 12 in the metal cap 11, and then down through the cork 10, into the interior of the bottle, and the operator can grasp the hand piece 16 to direct and press the device downwardly as shown in Fig. 5.

In the preferred manner of introducing the gas conduit 17 into the bottle or container through the seal, the bottle is whirled or rotated about its own center, and this is effected by placing the bottle on a support 50, which is mounted on a shaft 51. Shaft 51 is journaled in a frame 52, and is rotated by means of a pulley 53, which pulley is driven by a belt 54 from a suitable motor, not shown. The bottle or container support 20 has fingers 25 which engage the bottle friction tight, and hold it so that it will rotate with the support.

The operator presses down with his hand upon the hand piece 16, and the point of conduit 17 goes cleanly through the seal, as shown in Fig. 7. The seal pressing and gas conducting device 17, it will be noted, is permanently attached to the gas supplying devices, and needs no attention, save as to turning on and off the gas. When the member 17 is through the seal, it is firmly held in place by friction with its hole in the seal 10, and at the same time it effectually maintains the sealed condition.

Figure 8:
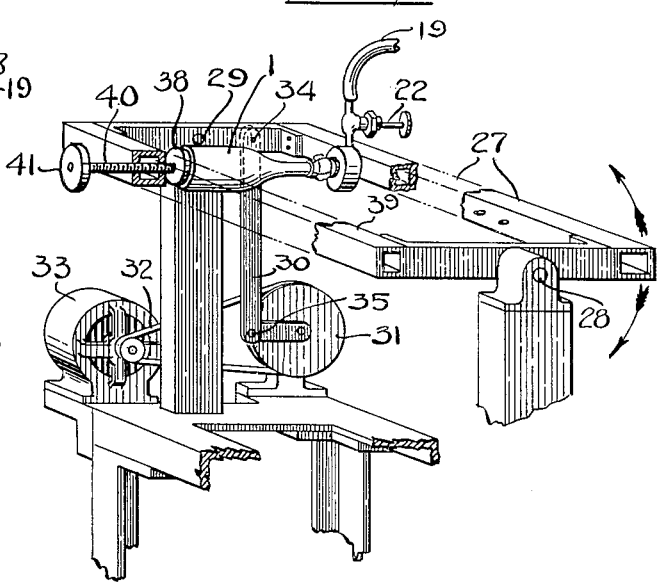
Fig. 8 shows the oscillating frame for a battery of bottles or containers.

In the preferred manner of effecting the charging of the juice with the gas, as stated, the bottles are rocked during the introduction of the gas so that the tops and bottoms thereof are alternately above and below each other, the gas thus traveling or bubbling in both directions through the juice. This operation is preferably performed by or with the aid of a mechanism, and as illustrated, a rocking frame 27 (Fig. 8) is pivotally mounted at 28 and 29 upon a suitable support, and is rocked or oscillated by a link 30. Link 30 is pivoted to the frame at 34, and at 35 it is pivoted eccentrically to a pulley 31. Pulley 31 is rotated by a belt 32, driven from a motor 33.

The top face of hand piece 17 engages with pins 36 and 37 fixed in frame 27 and a clamp 38, mounted on a rod 40, fits into or against the bottom of the bottle or container 1. Rod 40 is screwthreaded into the reach or side 39 of frame 27, and has a hand wheel 41 by which it is turned to engage and hold, or to release, the bottle 1. A group of the bottles may have the gas introducing devices put through their seals and they may be placed in the frame 27 side by side and charged at the same time.

Figure 9:
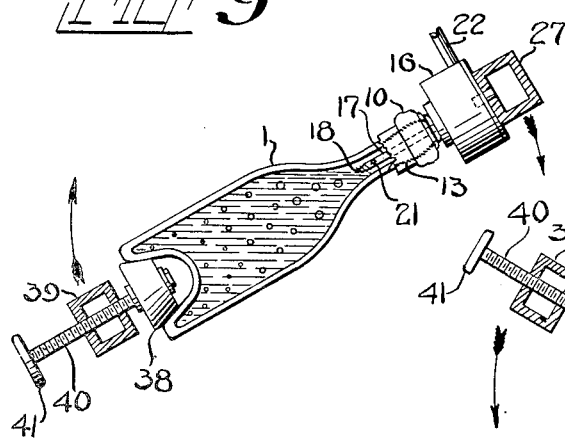
Figs. 9 and 10 show the bubbling or flow of the gas to and fro through the liquid in the bottle.
Figure 10:
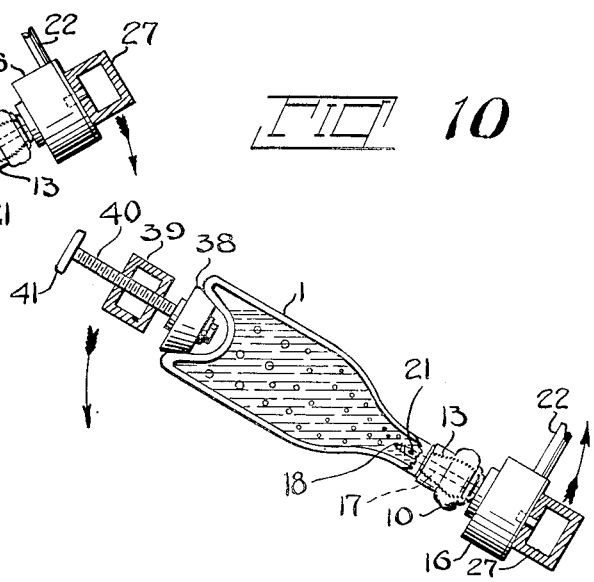

When the bottles are in the frame and are rocked to and fro as from the position shown in Fig. 9 to that of Fig. 10, the valves 22 and 23 for each bottle are manipulated to turn the gas into the bottles. The gas is thus bubbled or flowed through the juice in the bottle first in one direction and then in the other, over and over, until the juice is thoroughly saturated with the gas.

When the charging of the juice with gas is completed, the valves of the charging mechanism are closed, and the bottles are removed from the rocking frame by turning the respective hand wheels 41, and thereby withdrawing the respective clamps 38 from engagement with the bottoms of the bottles. The bottles still have the seal piercing and gas conducting members 17 serving as seals for the respective bottles.

The members 17 are withdrawn and this is done preferably by placing the bottles on the support 20, as shown in Fig. 11, and rotating the support in the opposite direction from that by which the member 17 was inserted. When the member 17 is withdrawn, the small opening which it made through the seal is left open for a brief instant. There can be no ingress of air, however, as the high pressure of the gas in the space 15 within the bottle will cause the gas to flow outwardly and thus effectually prevent the entrance of any air.

On the instant that the member 17 is withdrawn, however, the hole through the seal is tightly closed and sealed. For this purpose, a plug 44 is provided. This is made of fiber or other insoluble and flavorless material, and if desired it may be screw threaded on its point or inner end, and on its head or outer end it preferably has a slot 45.

While the bottle 1 is still upon the support 20, and immediately after the member 17 has been withdrawn from the seal and while there is a strong outflow of gas through the small hole in the seal, plug 44 is inserted in the hole and driven home. This is preferably done by rotating the bottle 1 in the proper direction, while holding the plug 44 against rotation and pressing down thereon, as shown in Fig. 13.

After the plug is driven home air tight, the top thereof is cut off smoothly over the top of the bottle seal, as shown in Fig. 14. There is thus produced a package of fruit juice completely sterilized against fermentative infection and thoroughly charged with gas after sealing and sterilization, all air infection and contamination having been effectually prevented during the charging and the subsequent resealing.

The invention in accordance with certain of its features provides for the arresting of fermentation after it has proceeded to a certain degree, as well as the prevention entirely of any fermentation, as has already been described. Thus, when grape juice, for example, has fermented so as to have a certain percentage of alcohol, it can then be sealed and sterilized and further fermentation prevented. The carbonating thereof may be effected in the manner already described and by this means a carbonated juice or wine is produced having a relatively low percentage of alcohol, and the alcoholic content having been predetermined or regulated precisely as described.

By the general method herein described, a much higher pressure of gas can be used without bottle breakage than by the methods heretofore in use, and as a result of the foregoing, the juice may be much more highly charged with gas. The previously known method of carbonating could not carbonate a pure fruit juice so that it would keep more than two or three days without fermentation setting in, unless a chemical preservative were added. By the present invention the pure carbonated fruit juice will keep indefinitely or permanently without any chemicals whatever. By the invention also, all objectionable foaming of the juice is obviated, due to keeping the juice out of contact with the air.

In practice it is found that an efficient and satisfactory sterilizing heat is about 165 degrees Fahrenheit, although this is not restrictive of the invention. By the oscillation of the bottles, and the consequent repeated flowing of the gas first in one direction and then in the other, through the liquid in connection with the other steps and conditions described, the juice is completely saturated or charged, and the effervescent property of the juice is thereby greatly enhanced.

It will be understood that changes may be made in the details of practising the invention as herein set forth without departing from the principles of the invention and without sacrifice.

What I claim is:—

1. A process of treating fruit juice comprising charging sterilized juice in sterile condition in sealed containers with carbonating gas while maintaining the juice at all times free from contact with air and in sterile condition.

2. The process of treating fruit juice comprising sealing the juice in containers, sterilizing the juice in the containers after sealing and charging the sealed sterilized juice with carbonating gas while maintaining the juice at all times free from contact with air and in sterile condition.

3. The process of treating fruit juice which comprises filling a container, sealing the container, sterilizing the juice in the sealed container, and introducing a gas conduit into the sealed container and charging the juice with carbonating gas through the conduit while maintaining the sealed condition, withdrawing the conduit after charging the juice and sealing the opening made by the conduit.

4. The process of treating fruit juice which comprises filling a container, sealing the container, sterilizing the juice in the sealed container, and introducing a gas conduit into the sealed container and charging the juice with carbonating gas through the conduit while maintaining the sealed condition, withdrawing the conduit after charging the juice and sealing the opening made by the conduit while the gas in the container is above the atmospheric pressure.

5. The process of treating fruit juice which comprises filling a container, sealing the container, sterilizing by heat the juice in the sealed container, and introducing a gas conduit into the sealed container and charging the juice with carbonating gas through the conduit while maintaining the sealed condition, withdrawing the conduit after charging the juice and sealing the opening made by the conduit while the gas in the container is above the atmospheric pressure.

In testimony whereof, I have signed my name to this specification.

HERMAN BAULIG.